United States Patent [19]

Chapman et al.

[11] 4,022,756

[45] May 10, 1977

[54] DIMENSIONALLY STABLE 6TA/6IA FIBERS

[75] Inventors: Richard D. Chapman; Donald A. Holmer; Oscar A. Pickett, Jr.; James H. Saunders, all of Pensacola, Fla.

[73] Assignee: Monsanto Company, St. Louis, Mo.

[22] Filed: Apr. 9, 1975

[21] Appl. No.: 566,551

Related U.S. Application Data

[60] Continuation-in-part of Ser. No. 392,593, Aug. 29, 1973, abandoned, which is a division of Ser. No. 216,206, Jan. 7, 1972, abandoned.

[52] U.S. Cl. .................. 260/78 R; 260/30.8 R; 260/45.9 R; 260/78 S; 264/235; 264/346
[51] Int. Cl.$^2$ ........................................ C08G 69/26
[58] Field of Search .................. 260/78 R, 78 S

[56] References Cited

UNITED STATES PATENTS

| | | | |
|---|---|---|---|
| 2,766,221 | 10/1956 | Lum et al. | 260/78 R |
| 3,133,138 | 3/1964 | Alexander | 264/290 |
| 3,325,342 | 6/1967 | Bonner | 161/178 |
| 3,379,695 | 4/1968 | Wolfes et al. | 260/78 R |
| 3,382,216 | 5/1968 | Blaschke et al. | 260/78 R |
| 3,454,536 | 7/1969 | Schade et al. | 260/78 R |
| 3,475,387 | 10/1969 | Carter et al. | 260/78 R |
| 3,790,423 | 2/1974 | Jones | 156/331 |
| 3,839,296 | 10/1974 | Campbell | 260/78 R |
| 3,941,755 | 3/1976 | Chapman et al. | 260/78 R |

OTHER PUBLICATIONS

Moncreif–Man Made Fibers, 1959, pp. 52–53, 62–67.

*Primary Examiner*—Harold D. Anderson
*Attorney, Agent, or Firm*—John W. Whisler

[57] ABSTRACT

Dimensionally stable fibers are produced from copolymers prepared from substantially equimolar amounts of hexamethylene diamine and a 50:50 to 80:20 mixture of terephthalic and isophthalic acids by heating essentially amorphous fibers melt spun from the copolymers to a temperature between about 160° C. and 300° C. for a short period of time. The dimensionally stable fibers combine many of the best properties of nylon 66 and poly(ethylene terephthalate) and are particularly useful in tire and textile applications.

3 Claims, 1 Drawing Figure

DIMENSIONALLY STABLE 6TA/6IA FIBERS

CROSS REFERENCE TO RELATED APPLICATIONS

This application is a continuation-in-part of copending application Ser. No. 392,593, filed Aug. 29, 1973, which in turn is a division of application Ser. No. 216,206, filed Jan. 7, 1972, both now abandoned.

BACKGROUND OF THE INVENTION

1. Field of the Invention

This invention relates to dimensionally stable fibers of a copolyamide consisting essentially of recurring units of the formulas wherein from 50 to 80 mole percent of the units are Formula (I) units.

2. Description of the Prior Art

Polyhexamethylene adipamide (i.e., nylon 66) fibers and polyethylene terephthalate (i.e., PET) fibers are widely used commercially in tire and textile applications. Nylon 66 fibers are considerably more durable than PET fibers and therefore are preferred in applications such as carpets, ropes and other applications where durability is of major concern. In tire applications, both nylon and PET fibers are used in large quantities. Nylon 66 fibers have a lower modulus than PET fibers but are more durable and have better adhesion to rubber characteristics. Tires reinforced with nylon 66, however, are not used as original equipment on automobiles due to their tendency to flatspot. In apparel applications where wrinkle resistance is a major factor, PET fibers are used much more extensively than nylon 66 fibers, even though nylon 66 fibers have superior dye performance. Nylon 66 fibers are easily dyed with acid dyes to bright and brilliant colors, whereas PET fibers are not. The dyeing of PET fibers requires the use of pressure and carriers which adds an extra 8 to 12 cents per pound to the cost of the dyed fibers. Additionally, dyed PET fibers do not possess good light fastness and the use of carriers tends to cause air pollution.

It is apparent from the foregoing discussion that fibers having the best properties of both nylon 66 and PET fibers without the shortcomings of either would be highly desirable and represent a major contribution to the art. Such fibers would have the durability, adhesion to rubber, and dye performance of nylon 66 fibers and the modulus, wrinkle resistance and non-flatspotting characteristics of PET fibers. To have major significance, of course, such fibers should be prepared from available raw materials and should cost no more than either nylon 66 or PET fibers.

A fiber meeting the above-mentioned criteria will be dimensionally stable, that is, it will be molecularly oriented (i.e., drawn) and have crystalline regions as well as amorphous regions in its structure. Essentially amorphous fibers, even though molecularly oriented, lack dimensional stability, and, therefore are not useful. Dimensionally stable fibers have low shrinkage values when subjected to heat, such as when placed in boiling water, and also have good elastic recovery properties. The ability of fibers to develop crystalline regions depends to a great extent on the regularity of their particular structure and the chemical nature of their polymer chains. Since a crystalline region in a polymeric fiber is essentially one where the polymer chains are arranged in an orderly and regular fashion, any factors which decrease the regularity of the polymer chains will also significantly reduce the ability of the fiber to crystallize. Thus, it is not surprising that fibers consisting of a copolymer having two different recurring units will have difficulty in crystallizing, particularly when each of the units makes up at least 10 percent or more of the copolymer. For example, copolyamide fibers consisting of equal portions of nylon 6 and nylon 66 recurring units are essentially amorphous, lack dimensional stability, and cannot be made appreciably more crystalline by techniques such as by drawing and/or heating.

Polyhexamethylene terephthalamide (i.e., 6TA) fibers are crystalline fibers having good properties. However 6TA fibers melt at about 370° C., too high for conventional melt spinning, and hence are prepared by solution spinning techniques using sulfuric acid as the solvent. Recovery of sulfuric acid is expensive and disposal thereof is unacceptale from environmental viewpoints. Polyhexamethylene isophthalamide (i.e., 6IA) fibers are essentially amorphous and thus are not useful. Copolyamide fibers are known to be difficult to crystallize, especially when the comonomers exceed about 10%. Also, shrinkages are generally high with fibers of copolymers. Accordingly, copolyamides in which the comonomers exceed about 10% have not heretofore been used commercially in tire and textile fiber applications, although they are extensively used in coating and molding resin applications.

SUMMARY OF THE INVENTION

The present invention provides useful, dimensionally stable fibers made from a random copolyamide prepared from hexamethylene diamine, isophthalic acid and terephthalic acid. The copolyamide consists essentially of the following recurring units:

where the mole ratio of 6TA units to 6IA units is from 50:50 to 80:20. This copolyamide is designated hereinafter as 6TA/6IA polymer and fibers made therefrom are designated as 6TA/6IA fibers. The term fiber as used herein includes continuous filament yarns, monofilaments, tows and spinnable staples.

The copolymeric fibers of the present invention can be melt spun, thus avoiding problems associated with solution spinning from acids, and with the application of special heat treatment, hereinafter described, can be crystallized so as to provide dimensionally stable fibers having good properties including low shrinkage. The 6TA/6IA fibers of the invention combine many of the best properties of both nylon 66 and PET fibers and are characterized in having boiling water shrinkage (BWS) values of less 1.65% up to less than 10 percent, for example, between 2 and 8 percent. The fibers of the invention have the adhesion to rubber and dye performance of nylon 66 fibers and the modulus, wrinkle resistance and non-flatspotting characteristics of PET fibers. Thus, the fibers of the invention provide improved fibers for use in tire and textile applications, such as, in carpets and apparel. The raw material cost for these fibers is no greater than that for nylon 66, and the dyeing cost per pound of fabric is less than that of PET.

The fibers of this invention may be prepared by melt spinning 6TA/6IA polymer to provide essentially amorphous fibers and then subsequently drawing and heating the fibers to a temperature which is above the glass transition temperature of the 6TA/6IA polymer and below the temperature at which the 6TA/6IA fibers become molten.

As-spun 6TA/6IA fibers are essentially amorphous, lack dimensional stability and crystallize only very slightly when cold drawn. In contrast, fibers of the present invention have a relatively high degree of crystallinity as evidenced from their dimensional stability, degree of lateral order (DLO) value and other physical properties. It is surprising and unexpected in view of the irregularity of the 6TA/6IA polymer structure and in view of the proportion of 6TA and 6IA units present in the polymer chain that the as-spun, essentially amorphous 6TA/6IA fibers are capable of being sufficiently crystallized to provide useful, dimensionally stable fibers.

DETAILED DESCRIPTION OF THE PREFERRED EMBODIMENTS OF THE INVENTION

6TA/6IA fibers of the invention are preferably prepared as follows: 6TA/6IA polymer is prepared by melt polymerization of an appropriate mixture of the hexamethylene diamine salts of terephthalic and isophthalic acids (i.e., 6TA salt and 6IA salt) and melt spun into essentially amorphous 6TA/6IA fibers which are then either drawn to a desired orientation and subsequently heated (i.e., annealed) or simultaneously drawn and annealed.

6TA/6IA Polymer Preparation

The 6TA/6IA polymers useful in practicing this invention may be prepared by a melt polymerization procedure wherein an aqueous solution of appropriate amounts of a mixture of 6TA salt and 6IA salt is heated in a conventional manner under conditions of controlled time, temperature and pressure. Preferably, the polymerization is conducted in three cycles. During the first cycle the reaction mixture is heated in the presence of an inert gas such as nitrogen from room temperature to about 200° C. while under pressure of about 250 psig. During the second cycle the reaction mixture is heated to about 300° C. or higher, for example 310° C., while holding the pressure substantially constant. During the third cycle the temperature is increased slightly, for example, an additional 10° to 20° C. while the pressure is reduced to atmospheric pressure. Optionally, after completion of the third cycle the resulting molten mass is held at atmospheric pressure at or above the melting temperature thereof for a period of time sufficient to bring it to equilibrium, for example 30 minutes. The optimum time, temperatures and pressures involved in conducting each of the polymerization cycles will vary somewhat depending on the melting point of the particular 6TA/6IA copolymer being prepared.

In preparing 6TA/6IA polymers in the manner just described there is a tendency for the polymerization product to phase-out, that is, to form a two phase system, a solid phase and a liquid, from which useful fibers cannot be melt spun. Under certain circumstances phase-out may even result in complete solidification of the polymerization mass. In general, phase-out does not occur unless the mole percentage of 6TA of the salt mixture is about 60% or higher. The tendency for phase-out to occur increases as the percentage of 6TA in a mixture increases from 60% to 80%.

Phase-out may be prevented without adversely affecting the properties and quality of the resulting 6TA/6IA polymer or fiber made therefrom by controlling the time/temperature/pressure profile during polymerization or by the use of appropriate additives. Phase-out may be prevented by either one of two polymerization procedures. One procedure (referred to herein as Procedure A) consists of conducting the melt polymerization in the presence of a small, but effective amount of a suitable heat stabilizer and a suitable plasticizer, using 6TA and 6IA salts having a pH of 7.2 ± 0.2. In this procedure the second cycle time may be allowed to vary from 30 to about 60 minutes. Another procedure (referred to herein as Procedure B) consists of using 6TA and 6IA salts having a pH of 7.2 ± 0.2 and carefully controlling the time taken to accomplish the second cycle of the polymerization to 35 ± 5 minutes and, if necessary, conducting the polymerization in the presence of a plasticizer. Normally, the use of a plasticizer with Procedure B is necessary to prevent phase-out only when the 6TA/6IA salt mixture consists of about 70 mole percent or more of 6TA salt.

Preferred heat stabilizers for use in Procedure A include, but are not limited to, sterically hindered phenols, such as 4,4'-dihydroxy-3,3'5,5'-tetra-t-butylbenzylether and 4-hydroxymethyl-2-6-di-t-butylphenol. Generally, from 0.05 to 1% by weight of the stabilizer based on the weight of salts is effective in preventing excessive degradation when using Procedure A. The presence of the stabilizer during polymerization does not have a noticeable effect on the tensile properties or boiling water shrinkage values of the resulting 6TA/6IA fibers, yet its presence does provide for whiter fibers of enhanced heat stability. Thus, if desired, a heat stabilizer may also be used with Procedure B.

A particularly preferred plasticizer that may be used in carrying out either Procedure A or B is Santicizer-8 plasticizer which is supplied by Monsanto Company and is a mixture consisting of 40% by weight of N-ethyl-o-toluenesulfonamide and 60% by weight of N-ethyl-p-toluenesulfonamide. Instead of or in addition to Santicizer-8 plasticizer any other suitable plasticizers or mixtures thereof may be used. Generally, from 5% to 25%, based on the weight of 6TA and 6IA salts, is sufficient to prevent phase-out when using Procedure A or B to prepare 6TA/6IA polymers containing between 70 and 80 mole % 6TA units. The use of a plasticizer with either Procedure A or B has little effect, if any, on the properties of fiber made from the resulting 6TA/6IA copolymer since most of the plasticizer is removed by vaporization from the copolymer during polymerization and processing thereof into fiber. Thus, if desired, a plasticizer may be used in preparing any of the 6TA/6IA polymers described herein even though its presence is not always required to prevent phase-out during polymerization.

Preferably, the 6TA and 6IA salts used in the melt polymerization should be of the highest possible purity. The presence of even trace amounts of impurities in the salts may be detrimental to the quality of the resulting copolymer and fiber made therefrom. For example, the presence of 10 ppm of carboxybenzaldehyde has been found to apparently catalyze formation of bishexamethylenetriamine and other materials such as ammonia and hexamethyleneimine. Bishexamethylenetriamine can cause branching and eventual gelation of the resulting copolymer. Under these circumstances, the copolymer may not process easily, if at all, into useful fiber or fiber processed therefrom may be discolored and/or of non-uniform denier and low quality.

6TA/6IA Fiber Formation

6TA/6IA polymer may be formed into fibers by conventional melt spinning techniques commonly employed in the manufacture of nylon 66 fibers and other polyamide fibers.

Thus, following the melt polymerization cycles described above, the resulting molten 6TA/6IA polymer may be directly spun into fibers or it may be extruded and made into flake that is subsequently remelted and spun into fibers. Preferably, when melt spinning is accomplished using flake, the flake is first dried, for example, in a vacuum oven for 12 hours at 100° C., to enhance its extrusion characteristics. The resulting as-spun 6TA/6IA fibers are essentially amorphous.

Annealing of 6TA/6IA Fibers

The annealing of the essentially amorphous 6TA/6IA fibers may be accomplished during or after the fibers are drawn to a desired denier. Generally, the fibers are drawn a total of 3.0 to 5.0 times their original length. When the fibers are drawn prior to annealing, they may be drawn in a single stage over a heated pin (85°–115° C.). Drawing of the essentially amorphous 6TA/6IA fibers without annealing results in orientation of the polymer molecules in the direction of the fiber axis but does not significantly increase the crystallinity of the fibers. However, after the drawn, essentially amorphous 6TA/6IA fibers are annealed in the manner described herein, the fibers have a relatively high degree of crystallinity.

Annealing of the fibers is conveniently accomplished by heating the fibers to a temperature which is above the glass transition temperature (Tg) of the 6TA/6IA polymer and below the temperature at which the fibers become molten and, preferably, at a temperature between 160° C. and 300° C. Heating of the fibers may be accomplished by subjecting the fibers to a heated environment, such as a heated inert fluid (e.g., steam, air or nitrogen) or a heated surface such as a hot shoe. A preferred means for heating the fiber is accomplished by continuously advancing the fiber through an electrically heated tube blanketed with steam or heated nitrogen. Other means include continuously advancing the fiber through an infra-red heater or over a heated curved surface. If desired, the fiber may be merely placed into an oven and heated. The length of time the fiber is in contact with the heated environment will depend on factors such as the temperature of the heated environment and denier of the fiber. Various means and conditions that may be used in annealing the 6TA/6IA fibers of the invention will be apparent to those skilled in the art.

It has been found that the physical properties of the annealed 6TA/6IA fibers are influenced by the amount of tension the fibers are under while being annealed. For example, drawn fibers which are slack when annealed will have minimum boiling water shrinkage (BWS) values, for example up to 2%, while drawn fibers which are under considerable tension when annealed (e.g., when further drawn at a draw ratio of 1.12 to 1.2 during annealing) generally will have BWS values between 8% and 10%, for example ~ 9.0%. Accordingly, drawn fibers which are under intermediate tensions when annealed will have BWS values ranging from 2% to 9%. The strength of the fibers on the other hand is directly proportional to the amount of tension the fibers are under during annealing; fibers which are under tension when annealed will have greater strength than fibers which are slack when annealed.

Examples of several means which may be used in annealing 150 denier drawn fibers (i.e., yarn) to provide dimensionally stable 6TA/6IA fibers of the present invention are given below:

A. continuously advancing the fiber at a speed of 11 m./min. through a 6.35 mm. by 152.4 cm. electrically heated tube blanketed with steam, wherein the temperature of the steam at the entrance of the tube is 100° C. and increases to 240° C. at the exit of the tube;

B. continuously advancing the fiber at a speed of 91.4 m./min. over a hot shoe (curved surface) having a length of 101.6 cm, and being maintained at 200°–210° C.;

C. continuously advancing the fiber at a speed of 121.6 m./min. through an infra-red heater having a length of 30.5 cm. and being maintained at a temperature of 475° C.

Figure 1:
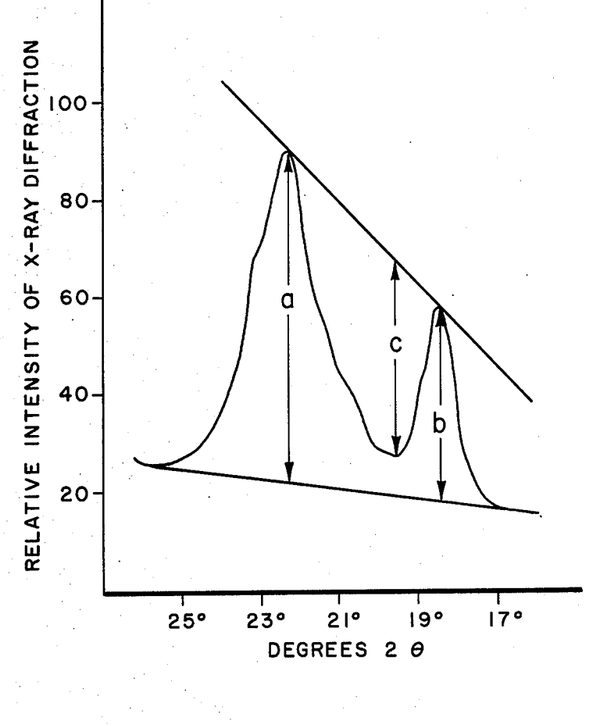
The FIGURE represents a plot of the intensity of the X-ray diffraction pattern of a typical crystalline 6TA/6IA fiber. From this plot the degree of lateral order (DLO) of the particular 6TA/6IA fiber can be determined. The DLO value is an indication of the degree of crystallinity of the fiber; a high DLO value indicates a high degree of crystallinity. The 6TA/6IA fibers of the present invention have DLO values of 70% or higher.

Examples are given hereinaftr for purposes of further illustrating the invention and are not intended to in any way limit the scope thereof. In these examples the following tests and measurements are referenced:

Degree of lateral order - A measure of the relative intensity of the two major equatorial diffraction peaks is given by the degree of lateral order (DLO). A suitable method for determining the DLO involves the use of a reflection technique to record the intensity trace of the X-ray diffraction pattern with an X-ray diffractometer. In the examples that follow the DLO was determined using a Philips diffractometer having a vertical goniometer that is designed for use with proportional detectors, a proportional detector and a Philips data processor equipped with a pulse height analyzer. The diffractometer used standard parallel slit assemblies, 1° divergence and receiving slits and a 0.076 mm. scatter slit. Each sample was mounted by winding fibers parallel on a sample holder which was mounted in the diffractometer with the fiber axis normal to the X-ray beam. Using nickel-filtered Cu radiation and a Philips data processor equipped with a pulse height analyzer, a trace of the intensity is recorded from 16° to 26°, $2\theta$, at a scanning speed of 1°, $2\theta$ per minute, a chart speed of 1 inch per minute, and a time constant of 2; $2\theta$ being the angle between the undiffracted beam and the diffracted beam. A typical trace appears in the figure. A smooth line was drawn as indicated to compensate for instrument noise. Also, a line was drawn between the two peaks and at the base of the curve and also vertical lines a, b and c, as indicated. The DLO is then calculated from the equation $$\text{DLO} = \frac{c}{\frac{a+b}{2}} \times 100 = \frac{2c}{a+b} \times 100$$

Percent boiling water shrinkage is determined by immersing a length of fiber (Lo) in boiling water for a period of 10 minutes and then measuring the decrease in its length (Lo-Li); this value, expressed as a percentage of the length of the fiber before its immersion in boiling water is the percent boiling water shrinkage (% BWS) of the fiber, i.e., % BWS = (Lo-Li/Lo) × 100.

Generally, the percent boiling water shrinkage value and the DLO value for a 6TA/6IA fiber of a given composition are closely related, that is, as the % BWS value decreases the DLO value increases. For this reason, the % BWS value of a 6TA/6IA fiber is representative of its degree of crystallinity. For example, a boiling water shrinkage value of less than 20% represents a DLO value of 40% or greater; a boiling water shrinkage value of less than 10% represents a DLO value of 70% or greater.

Intrinsic Viscosity - intrinsic viscosity $[\eta]$, is defined by the following equation:

$$[\eta] = \frac{\sqrt{2}}{C} (RV = 1 = \ln RV)^{1/2}$$

wherein RV represents the relative viscosity and C represents a concentration of 0.4 grams of the polymer in 100 ml. of solvent. The relative viscosity RV is determined by dividing the flow time in a capillary viscometer of a dilute solution of the polymer by the flow time for the pure solvent. The dilute solutions used herein for determining RV are of the concentration expressed by C above; flow times are determined at 25° C., using concentrated (95-98%) sulfuric acid as a solvent.

Tensile properties of fibers were measured on an Instron tester. Fiber properties of tenacity, elongation and initial modulus, T/E/M, are expressed in their conventional units, that is, tenacity and modulus in grams per denier (gpd) and elongation in percentage (%).

Unless otherwise expressed in the examples, percentages are on a weight basis.

EXAMPLE 1

This example illustrates the preparation of 6TA and 6IA salts that were used in preparing the 6TA/6IA copolymers described in examples 2-10.

6TA Salt

Terephthalic acid (9137 g.) was slurried with 22 liters of deionized water in a stainless steel vessel equipped with a steam coil and a heavy duty, high speed stirrer. Then, 7700 g. of 83% hexamethylenediamine aqueous solution was added very rapidly with stirring and the mixture was heated (90°–95° C.) until a clear solution resulted. Next, the pH of the solution was adjusted to 7.20 ± 0.10. Ion exchange resin (100 g. of Amberlite IR-120 resin supplied by Mallinckrodt Company) was added to the hot, stirred salt solution. The resulting mixture was stirred for 20 minutes and then filtered into a stainless steel vessel. The filtrate was stirred and allowed to cool slowly to room temperature. The resulting crystallized 6TA salt was collected on a filter and dried in a vacuum oven at 90° C. to a moisture level of less than 0.5%. The dry 6TA salt was recrystallized from 15 liters of deionized water. The resulting 6TA salt, after drying had a pH of 7.10 ± 0.10 (measured on a 10% aqueous solution) and a moisture level of less than 0.10%.

6IA Salt

Isophthalic acid (14,120 g.) was slurried in 14 liters of deionized water using the above apparatus. Then, 11,900 g. of 83% hexamethylenediamine aqueous solution was added very rapidly with stirring and the mixture was heated (90°–95° C.) to provide a hot, clear solution having a pH of 7.20 ± 0.20. The hot solution was filtered into a stainless steel vessel and the resulting filtrate was stirred and allowed to cool to room temperature. The resulting crystallized 6IA salt was collected and dried in a vacuum oven at 90° C. to a moisture level of 0.5% or less. Then, 14,400 g. of the dried 6IA salt was recrystallized from 9.6 liters of deionized water and dried. The resulting dried salt had a pH of 7.20 ± 0.20 (measured on a 10% aqueous solution) and a moisture level of less than 0.10%.

EXAMPLE 2

This example illustrates the preparation of dimensionally stable 6TA/6IA fibers of the present invention having a mole ratio of 6TA to 6IA of 65:35, i.e., 6TA/6IA (65/35). The following procedure (Procedure A) was employed in preparing the 6TA/6IA fiber. 4-Hydroxymethyl-2,6-di-t-butylphenol was employed as a heat stabilizer and S anticizer-8 plasticizer as a plasticizer.

97.5 parts of 6TA salt of pH 7.00 and 52.5 parts of 6IA salt of pH 7.00 together with 100 parts of deionized water, 0.13 parts of benzenephosphonous acid (added to improve spinning performance), 0.26 parts of 4-hydroxymethyl-2,6-di-tert-butylphenol, and 5.20 parts of Santicizer-8 plasticizer were charged to a stainless steel, high pressure autoclave. The autoclave was purged of air by use of purified nitrogen. While under a nitrogen pressure of 250 psig the autoclave ingredients were slowly heated until a temperature of 302° C. was reached during which time steam was removed from the autoclave and the ingredients were continuously agitated by means of a wall-scraping blade contained within the autoclave. At this point (302° C.) the autoclave pressure was gradually reduced over 25-minute period to atmospheric pressure while allowing the melt temperature to rise and level out at 320° C. The polymer was then extruded from the autoclave, cooled and comminuted. Intrinsic viscosity of the polymer was 0.75. Dry, ground polymer was melted in a 1.9 cm. heated screw extruder. The resulting molten polymer was pumped through a 14-hole heated (320° C.) spinneret to form a yarn that was drawn over a heated pin (90° C.) to provide a 72 denier yarn having the following properties: T/E values of 4.4 gpd/11% and a BWS value of 21%.

Samples of the above yarn (samples 2A-2D) were each continuously advanced at a speed of 9.1 m./min. through a 6.35 mm., inside diameter, stainless steel tube while under tension using suitable tension rolls. The tube was heated by means of an electrical heating jacket and also by means of an inert gas (nitrogen) that was preheated and then introduced into the tube at a point through a conduit which joined the tube at a 90° angle, approximately midway from each end thereof. The tube was 64.5 cm. long with the jacket covering 52.7 cm. of its length. The tension and/or the heating conditions were varied from sample to sample as indicated in Table 1; the tension applied to each yarn is expressed in terms of draw ratio (DR). The denier, % elongation (%E), tenacity (T) and % boiling water shrinkage (BWS) of each of the yarn samples are also given in Table 1.

TABLE 1

| Sample | Draw Ratio | Jacket | Pre-Heater | Denier | %E | T(gpd) | %BWS |
|---|---|---|---|---|---|---|---|
| Control | — | — | — | 72 | 11 | 4.4 | 21.0 |
| 2A | 1.0 | 180 | 180 | 72 | 16 | 5.2 | 8.9 |
| 2B | 1.0 | 200 | 200 | 72 | 18 | 4.7 | — |
| 2C | 1.2 | 220 | 220 | 60 | 13 | 4.8 | 8.5 |
| 2D | 1.2 | 240 | 240 | 63 | 18 | 4.1 | — |

EXAMPLE 3

In this example dimensionally stable 6TA/6IA (65/35) yarn (140 filament) was prepared according to the procedure employed in Example 2. The annealing conditions, the tensile properties of the annealed yarn and the properties of the annealed yarn are given in Table 2.

TABLE 2

| Sample | Draw Ratio | Jacket | Pre-Heater | Denier | %E | T(gpd) | Mod (g/den.) |
|---|---|---|---|---|---|---|---|
| Control | — | — | — | 890 | 7.0 | 3.5 | 86 |
| 3A | 1.2 | 280 | 280 | 778 | 9.0 | 5.3 | 98 |

The annealed yarn was converted into tire cord and bias tires were constructed using the cord in the tire carcass. The tires were found to be non-flatspotting, whereas similar tires prepared using conventional nylon 66 tire cord showed severe flatspotting. Thus, the 6TA/6IA (65/35) yarn provides a nylon cord having the unusual advantage of superior non-flatspotting performance.

EXAMPLE 4

This example illustrates the simultaneous drawing and annealing of as-spun 6TA/6IA (65/35) yarn to provide dimensionally stable yarn. The drawing and heating were accomplished using the heated tube described in examples 2 and 3. The conditions used in drawing and annealing the yarn and properties of the yarn produced thereby are given in Table 3.

TABLE 3

| Sample | Heating Temperature ° C. | Draw Ratio | T(gpd) | %E | %BWS |
|---|---|---|---|---|---|
| 4A | 260° | 3.0 | 3.2 | 34 | 7.7 |

EXAMPLE 5

This example illustrates the preparation of dimensionally stable 6TA/6IA (70/30) yarn. 6TA/6IA (70/30) polymer was prepared, melt spun into a 14 filament yarn and the yarn drawn to a denier of about 70 using the procedure described in Example 2. Samples of this yarn were each annealed using the technique and heated tube described in Examples 2 and 3. The temperature used in annealing each yarn sample and the BWS value obtained for each of the annealed yarns are given in Table 4.

TABLE 4

| Sample | Heating Temperature ° C. | Draw Ratio | %BWS |
|---|---|---|---|
| Control | — | — | 13.9 |
| 5A | 160° | 1.0 | 8.7 |
| 5B | 200° | 1.0 | 4.0 |
| 5C | 240° | 1.0 | 4.2 |

EXAMPLE 6

In this example 6TA/6IA (50/50) yarn was prepared and annealed using the procedure of example 2. Two separate runs were made (samples 6A and 6B). The results of the runs and conditions used are given in Table 5.

TABLE 5

| Sample | Heating Temperature ° C. | Draw Ratio | %BWS |
|---|---|---|---|
| Control | — | — | 48.0 |
| 6A | 180° | 1.0 | 9.4 |
| 6B | 200° | 1.0 | 7.1 |

EXAMPLE 7

The procedure of Example 6 was repeated with the exception that the yarn annealed in this instance was 6TA/6IA (60/40) yarn. The boiling water shrinkage values of annealed yarn samples (7A-7D) and the conditions used in the annealing are given in Table 6.

TABLE 6

| Sample | Heating Temperature ° C. | Draw Ratio | %BWS |
|---|---|---|---|
| Control | — | — | 23.8 |
| 7A | 160° | 1.0 | 9.4 |
| 7B | 180° | 1.0 | 6.8 |
| 7C | 200° | 1.0 | 6.2 |
| 7D | 220° | 1.0 | 5.8 |

EXAMPLE 8

The degree of lateral order (DLO) of several yarns of the present invention was determined according to the technique previously described herein. The results of the determinations are given in Table 7. The results illustrate that the annealing of the yarns significantly increases their DLO values.

TABLE 7

| | DEGREE OF LATERAL ORDER, % | | | | |
|---|---|---|---|---|---|
| | | Heat Treatment | | | |
| Yarn Composition | None | 180° C | 200° C | 220° C | 240° C |
| 6TA/6IA (50/50) | 0 | 75 | 85 | — | — |
| 6TA/6IA (60/40) | — | 81 | 85 | 93 | — |
| 6TA/6IA (65/35) | 24 | — | — | 75 | 89 |
| 6TA/6IA (70/30) | 33 | — | 73 | — | 99 |

EXAMPLE 9

This example illustrates the preparation of dimensionally stable 6TA/6IA (65:35) yarns of the present invention. The following procedure (Procedure B) was employed in preparing the 6TA/6IA yarns illustrated in this example:

6TA salt (975 g.), 6IA salt (525 g.) and deionized water (1000 g.) were charged to a stainless steel autoclave equipped with a helical band stirrer. After purging the reactor with purified nitrogen, the autoclave was sealed from the atmosphere. The contents of the autoclave were heated to 220° C. while being stirred at 18 rpm, at which point water began to flash from the system at 250 psig. The time required to complete this first cycle of the polymerization was 21 minutes. In the second cycle the pressure was maintained constant at 250 psig while the contents of the autoclave were heated to 300° C. over a 37 minute period. At this point (300° C., 250 psig) the pressure was reduced to atmospheric pressure over a period of 65 minutes while the temperature of the contents was increased to 320° C. At th end of this third cycle of the polymerization (320° C., 0 psig) the molten polymer was extruded through a 3.2 mm. circular die at the bottom of the autoclave. The molten polymer was blanketed with nitrogen and rapidly quenched in water. The resulting polymer having an [η] of 0.77, a melting point range of 300°–310° C. (as measured by differential thermal analysis, DTA) and a density of 1.180 g./cc. (as measured in a calibrated density gradient tube) was ground to a particle size of approximately 1.6 mm.

The ground polymer (1134 g.) was charged to a 3.785 liter (1 gal.) container equipped with an inert gas sweep and mounted on a rotating apparatus in an air oven. The container was then swept with nitrogen while rotating at about 65 rpm at room temperature for 15 minutes. Next, the oven was heated to 175° C. and rotation and nitrogen sweep of the container were continued for 3 hours, after which time the oven heat was turned off and the contents of the container were allowed to cool to below 100° C. The polymer was then removed from the container and dried for 8 hours in a vacuum oven at 70°–80° C. and at a pressure of < 25 mm. of Hg. The density of the resulting polymer was about 1.21 g./cc. while its melting point and [η] were unchanged. The drying of the polymer in the above manner enhances the extrusion characteristics thereof during subsequent spinning operations.

The dried polymer was heated in a screw melter to 320° C. The resulting molten polymer was passed from the screw to a metering pump and then to a spinneret assembly where the molten polymer was extruded at 320° C. through a 14-hole spinneret into yarn. The resulting yarn then passed over a finishing roll where about 4% by weight, based on the weight of the yarn, of a textile finish was applied to the yarn and was collected. The yarn was then drawn over two draw pins in series (the first pin was at a temperature between 60° and 90° and the second pin was at a temperature of about 115° C.) and collected.

Eight yarn samples (8A-8H) were prepared according to the above procedure. Each yarn was drawn to a denier of approximately 70 and had a BWS value of between 23 and 25%.

Each of the yarn samples was annealed by continuously advancing the yarn at a constant speed of 38.7 m./min. (draw ratio = 1.0) through an infra-red heater having a length of 30.5 cm. The temperature along the yarn path in the heater was 395° C. ± 5° C. The BWS values and T/E/M values of the annealed yarn and T/E/M values of the yarn prior to annealing are given in the following table.

TABLE 8

| Yarn Sample No. | Annealed Yarn | | Unannealed Yarn |
|---|---|---|---|
| | %BWS | T/E/M | T/E/M |
| 8A | 3.95 | 3.4/26/85 | 2.6/24/92 |
| 8B | 7.10 | 3.1/21/103 | 3.0/17/96 |
| 8C | 5.35 | 3.7/23/83 | 3.7/15/85 |
| 8D | 6.48 | 3.8/22/79 | 3.6/17/79 |
| 8E | 6.57 | 3.7/22/106 | 3.5/15/102 |
| 8F | 4.45 | 3.9/22/75 | 4.2/15/72 |
| 8G | 6.15 | 3.4/22/86 | 3.7/17/77 |
| 8H | 5.04 | 4.0/19/82 | 4.1/15/77 |
| Average | 5.14 | 3.6/22/87 | 3.6/17/85 |

The results in the table clearly show that yarns of the present invention have low BWS values (e.g., 5.14%) and good tensile properties.

EXAMPLE 10

This example illustrates the preparation of 6TA/6IA fiber of the present invention having BWS values of less than 2.0%.

6TA/6IA (60:40) yarn was prepared using the procedure described in example 8. The resulting yarn was drawn 4.1 X using two draw pins in series (the first pin was at a temperature of 75° C. and the second pin was at a temperature of 105° C.) to provide yarn having a BWS value of 30.2%, a denier of 72.3 and T/E values of 3.2 gpd/15.4%. The yarn was then annealed by advancing it upwardly through a vertically positioned, electrically heated tube having a length of 152.4 cm., an inside diameter of 2.54 cm. and an outside diameter of 3.18 cm. The tube was wrapped in three equal sections with heating wire; the temperature of each section was controlled separately. Steam was introduced into the tube through small orifices at the lower end of the tube. The temperature inside the tube was measured at points 15.2, 45.7, 76.2, 106.7 and 137.2 cm. from the lower end of the tube and found to be, respectively, 82° C., 145° C., 188° C., 216° C., and 245° C. Driven rolls over which the yarn passed were positioned above and below the tube and were used to advance the yarn through the tube. The rolls below the tube advanced the yarn at a speed of 11 m./min. while the rolls above the tube advanced the yarn at a speed of 10 m./min. The resulting annealed yarn had a denier of 79.5 and T/E values of 2 gpd/45.2%. The BWS value for each of three samples of the yarn was determined and found to be 1.66%, 1.65% and 1.66%.

EXAMPLE 11

This example illustrates the preparation of high modulus, high tenacity 6TA/6IA (65/35) fibers.

6TA/6IA (65/35) polymer was prepared as described in example 2 with the exception that 0.7 mole % of hexamethylenediamine (7.0 cc. of a 6.17% solution) was also initially charged to the autoclave. The resulting molten polymer was extruded through a 14-mole spinneret at the bottom of the autoclave at a pressure of 250 psig. and a temperature of 330° C. into yarn. The yarn was drawn 4.5 X over a heated pin (100° C.) and collected. The resulting 69 denier yarn had T/E values of 4.3 gpd/8.3%. This yarn was then annealed using substantially the same procedure and apparatus described in example 10 with the exception that nitrogen was used instead of steam. The yarn was continuously advanced into the electrically heated tube at a constant speed of 9.1 m./min. and was collected at a speed which resulted in the yarn being drawn 1.3 X during annealing. The temperature inside the tube along the yarn path was 125° C. (entrance), 150° C. (center) and 230° C. (exit). The properties of resulting annealed yarn along with typical nylon 66 and poly-(ethylene terephthalate) yarn are given below:

|  | 6TA/6IA (65/35) | Nylon 66 | PET |
| --- | --- | --- | --- |
| tenacity (gpd) | 7.5 | 5–9 | 5–8.5 |
| elongation (%) | 10.6 | 30–14 | 39–20 |
| modulus (gpd) | 119 | 35 | 35–85 |
| BWS (%) | 7 | 10–5 | 1.4–4.4 |
| LOI | 23.5 | 20.1 | 20.6 |

The LOI (limited oxygen index) was determined according to A.S.T.M. procedure D 2863-74. This procedure is a recognized method for testing the flammability of plastics using the oxygen method. According to this method the relative flammability of plastics is determined by measuring the minimum concentration of oxygen in a flowing mixture of oxygen and nitrogen that will just support combustion. Thus, the flame resistance of a plastic is directly proportional to its LOI value.

This example demonstrates that 6TA/6IA fibers of the present invention, when compared to nylon 66 and PET, have remarkable tensile properties and superior flame resistance.

EXAMPLE 12

In this example a carpet sample was prepared wherein one side of the carpet consisted of commercial nylon 66 carpet yarn and the other side consisted of 6TA/6IA (65/35) yarn of the present invention. The carpet sample was then tested for flame resistance and dyeability and the performance of the respective yarns in these tests was compared.

6TA/6IA (65/35) polymer was prepared as described in example 9. The polymer was then heated in a screw melter to 320° C. The resulting molten polymer was passed from the screw to a metering pump and then to a spinneret assembly where the molten polymer was extruded at 310° C. through a 17-hole spinneret into yarn. The polymer was extruded from the spinneret at a rate of 7.5 g./min. and the yarn was wound onto a bobbin at a constant speed of 120 m./min. This yarn was then plied 12 times to provide a total of 204 filaments. The plied yarn was drawn 3.5 X over two pins heated to 95° C. and 135° C. The drawn yarn was then simultaneously texturized and annealed by advancing the yarn at a constant speed of 40 m./min. into a stuffer box texturizing unit wherein the yarn was treated with steam at a pressure of 1 kg./cm.$^2$ gauge and at a temperature of 250° C. The resulting texturized yarn had 28 to 30% bulk and no measurable shrinkage. An X-ray diffraction pattern of the texturized yarn showed much sharper reflections than the drawn annealed yarn, indicating that the yarn had been annealed and crystallized during texturizing. Sixty-eight packages of this yarn were tufted into a polypropylene backing along with 100 packages of commercial nylon 66 carpet yarn to produce 9 m. of a 72 cm. wide carpet sample in which one side of the carpet facing was 6TA/6IA yarn and the other side was nylon 66 yarn. The 6TA/6IA side of the carpet sample had 750 g./m$^2$ (22 oz./yd.$^2$) of face yarn and the nylon half had 680 g./m$^2$ (20 oz./yd$^2$) of face yarn. This carpet sample was then dyed in a beck filled with water at 60° C. containing, based on the weight of the face yarns, 0.5% of a disperse dyestuff supplied by General Aniline and Film Corp. (i.e., Celliton Fast Blue AF Extra disperse dyestuff), 1.0% of a nonionic surfactant also supplied by General Aniline and Film Corp. (i.e., Igepal CO-710 nonionic surfactant) and 3.5% of ammonium acetate. The carpet sample was moved back and forth in the aqueous medium (i.e., dye bath) for a period of 60 minutes. During the first 40 minutes the temperature of the dye bath was increased to 100° C. at the rate of 1° C./min. During the last 20 minutes the dye bath was maintained at 100° C. The nylon 66 side of the carpet dyed first, but at the end of the 20 minute period, both sides had been dyed to nearly the same shade of blue. The carpet sample was then rinsed with water, dried, and a secondary backing of polypropylene was attached to the carpet sample opposite the yarn face side thereof with a latex cement. The carpet sample was then cut to provide a 6TA/6IA carpet sample and a nylon 66 carpet sample. Each of these samples were tested for flammability. In the flammability test a 2 in. X 24 in. (5.08 cm. X 60.95 cm.) carpet sample mounted to as asbestos board was placed pile face down on the ceiling of a vertical two foot tunnel with the sample inclined 28° from the horizontal. A flame source was placed 2¾ in. (6.985 cm.) from the lower end and 1⅜ in. (3.4925 cm.) below the sample. The flame source was provided by a gas burner adjusted to give a flame height of 6 inches (15.24 cm.). The frame of the tunnel is constructed of one-eighth inch (3.175 mm.) steel and a steel plate was placed on the top of the sample to prevent warping during the test. The sides of the tunnel consist of asbestos sheets cut in such a manner as to provide a constant draft through the tunnel. At the start of the test the burner was lit and burned for 4 minutes with the position of the flame spread being recorded every 15 seconds, where flame spread is the extent of travel in inches (or cm.) of a flame front across the surface of the sample. Similar samples of asbestos and red oak plank were also tested as standards in the manner just described. All samples, prior to testing, were conditioned at 73° C–75° C. and 50–55% relative humidity for a minimum of 24 hours. The maximum flame spread (FS) for each sample is the average of the three highest values obtained during each four minute recording period. From the recorded data the flame spread rate is calculated by the equation:

$$\text{FS rate} = \frac{\text{FS carpet sample} - \text{FS asbestos}}{\text{FS oak} - \text{FS asbestos}} \times 100$$

The number obtained by this test is based on two standard materials which have been assigned arbitrary flame spread ratings and is obtained as percent of difference between them. The two standard materials, asbestos millboard and red oak plank are arbitrarily assigned ratings of 0 and 100, respectively, and are the same as specified in ASTM method E84-61.

The results of the testing are given below:

| Yarn in Carpet | Flame Spread Rate |
|---|---|
| 6TA/6IA | 27.5 |
| Nylon 66 | 57.5 |

These results show that the 6TA/6IA carpet burned significantly slower than the nylon 66 carpet and demonstrate that 6TA/6IA fibers of the present invention have exceptional flame resistant characteristics.

EXAMPLE 13

This example illustrates an alternative annealing procedure that may be used in preparing 6TA/6IA fibers of the present invention. Ground 6TA/6IA (70/30) polymer was prepared according to the procedure described in example 2. The resulting ground polymer was dried in a vacuum oven at 85° C. ± 5° C. and at a pressure of < 25 mm. of Hg for 48 hours and then heated and melted in a screw melter. The resulting molten polymer was then extruded at about 320° C. through a 28-hole spinneret into yarn having a denier of about 485. Five yarns were prepared in the manner just described and plied to provide a large denier yarn. This yarn was simultaneously drawn and annealed by continuously advancing the yarn over a pair of driven rolls, through a tank of deionized water maintained at 95° C., over a second pair of driven rolls positioned under heat lamps which dried the yarns, over a finish roll where about 4% by weight, base on the weight of yarn, of a textile finish was applied to the yarn and finally onto a bobbin. The second pair of rolls was driven at a greater speed than the first pair of rolls whereby the yarn was drawn about 2.15 X while in the tank of water. The resulting annealed yarn had a BWS value of 6.3%.

EXAMPLE 14

This example illustrates unsuccessful attempts to provide dimensionally stable fiber from 6TA/6IA (40/60) polymer.

60 grams of 6TA salt and 90 grams of 6IA salt together with 100 cc. of water and 0.4 mole % of terephthalic acid as a viscosity stabilizer were charged to a stainless steel, high pressure autoclave. The autoclave was purged of air by use of purified nitrogen. While under a pressure of 250 psig (17.6 kg./cm² gauge), the autoclave ingredients were slowly heated (32 minutes) to 220° C. Then, while at this pressure, the ingredients were heated to 300° C. over a 29 minute period during which time steam was removed from the autoclave and the ingredients were continuously agitated. Then, the autoclave pressure was gradually reduced over a 25 minute period to atmospheric pressure while allowing the melt temperature to rise and level out at 318° C. Next, the resulting molten polymer is held at these latter conditions for 30 minutes. The autoclave was then pressurized with nitrogen to 200 psig (14.1 kg./cm² gauge) and the molten polymer at 314° C. was spun directly from the bottom of the autoclave through a 14-hole heated spinneret (320° C.) into yarn. The yarn was drawn 3.3 X over a heated pin (95° C.). The resulting yarn had a BWS value of 67.3%. A sample of this yarn was annealed using the procedure and annealing tube described in example 2. The temperature of the tube in this instance was 180° C. The annealed yarn had a BWS value of 31.2%.

This experiment demonstrates that 6TA/6IA (40/60) fiber does not provide the dimensionally stable fiber of the present invention. 6TA/6IA (40/60) fiber does not crystallize upon annealing, whereas 6TA/6IA fibers of the present invention are significantly crystalline.

In other experiments a series of samples of 6TA/6IA yarns were prepared in which the mole ratio of 6TA to 6IA varied from sample to sample. Each yarn sample was then annealed by placing it in a conventional differential thermal analysis instrument having two thermocouples within a chamber. The yarn sample was placed on one of the thermocouples and the other thermocouple was used as a standard. The temperature within the chamber was then increased linearly and the temperatures of the yarn sample and standard were measured by the thermocouples. The difference in temperature between the thermocouples was recorded on a printout by the instrument. Since crystallization of a yarn sample is exothermic, the printout will show a peak if crystallization of the sample occurs. A peak was not observed for samples having a mole ratio of 6TA to 6IA of 10:90, 20:80, 30:70 or 40:60, whereas a peak was observed for samples having a mole ratio of 6TA to 6IA of 50:50, 60:40, 65:35 and 70:30. These experiments demonstrate that 6TA/6IA fibers in which the mole ratio of 6TA to 6IA is 50:50 or greater may be annealed to provide crystalline, dimensionally stable yarns, whereas 6TA/6IA fibers having a mole ratio of 6TA to 6IA of less than 50:50 are essentially amorphous and cannot be made significantly crystalline or dimensionally stable by annealing.

We claim:

1. A molecularly oriented and annealed dimensionally stable fiber of a copolyamide consisting essentially of recurring units of the formulas wherein the mole ratio of units (I) to units (II) is between 50:50 and 80:20, said fiber being characterized in having a boiling water shrinkage value of 1.65% up to less than 10%.

2. The fiber of claim 1, wherein the mole ratio of units (I) to units (II) is from 60:40 to 70:30.

3. The fiber of claim 2 having a boiling water shrinkage value of between 2 and 8%.

* * * * *

UNITED STATES PATENT AND TRADEMARK OFFICE
CERTIFICATE OF CORRECTION

PATENT NO. : 4,022,756
DATED : May 10, 1977
INVENTOR(S) : Richard D. Chapman et al.

It is certified that error appears in the above-identified patent and that said Letters Patent are hereby corrected as shown below:

In Claim 3, line 1, the numeral "2" should be --1--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks